United States Patent [19]

Rogers et al.

[11] Patent Number: 5,055,050
[45] Date of Patent: Oct. 8, 1991

[54] FIRE FIGHTING TRAINER

[75] Inventors: William Rogers, Hopatcong; James J. Ernst, Livingston; Steven Williamson, Haledon; Dominick J. Musto, Middlesex, all of N.J.

[73] Assignee: Symtron Systems, Inc., Fair Lawn, N.J.

[21] Appl. No.: 545,300

[22] Filed: Jun. 26, 1990

[51] Int. Cl.⁵ .................... G09B 19/00; G09B 9/00; F23D 11/00
[52] U.S. Cl. .................................... 434/226; 431/2
[58] Field of Search .......................... 431/2; 434/226

[56] References Cited

U.S. PATENT DOCUMENTS

| | | | |
|---|---|---|---|
| 4,008,038 | 2/1977 | Berthiaume | 431/2 |
| 4,299,579 | 11/1981 | Swiatosz et al. | 434/226 |
| 4,303,396 | 12/1981 | Swiatosz | 434/226 |
| 4,669,972 | 6/1987 | Koslanski | 431/2 |
| 4,861,270 | 8/1989 | Ernst et al. | 434/226 |

Primary Examiner—Richard J. Apley
Assistant Examiner—Karen G. Horowitz
Attorney, Agent, or Firm—Richard T. Laughlin

[57] ABSTRACT

A fire fighting trainer for use in training fire fighters to extinguish jet crash fuel fires and the like, the trainer includes a supply pipe and control valve, a distribution pipe with holes, an open water tank with water within which the distribution pipe is disposed, so that liquid propane jets out from the holes, then passes as vapor bubbles to the water surface, then collects as propane vapor on the water surface, and a gas pilot flame device for lighting the propane vapor to form flames on the water surface. The simulated flames look very similar to jet crash liquid fuel flames.

12 Claims, 1 Drawing Sheet

FIRE FIGHTING TRAINER

The invention generally relates to a fire fighting trainer and, in particular, the invention relates to a fire fighting trainer having a liquid propane burner system and having a diffuser utilizing water, or other dispersive medium, such as gravel.

BACKGROUND OF THE INVENTION

The prior art fire fighting trainer is described in U.S. Pat. No. 4,861,270, issued Aug. 29, 1989, which is assigned to the same assignee as this application.

The prior art fire fighting trainer has a burner system and a support for the burner system, the burner system includes a delivery pipe having holes for ejecting propane to form a flame, a control connected to the delivery pipe, a pilot unit for lighting the ejected propane to form a flame, a control connected to the delivery pipe, and a pilot unit for lighting the ejected propane. One prior art system uses pressurized propane gas. Another prior art system uses pressurized propane liquid.

One problem with the prior art system using pressurized propane liquid is that is it is relatively difficult to light and control the pressurized propane vapor which is caused as the pressurized propane liquid jets out from the delivery pipe and then flashes to a propane vapor. Another problem is that the flame in the vicinity of the prior art delivery does not have the appearance of a liquid fuel spill flame, such as burning gasoline, oil, or jet fuel.

SUMMARY OF THE INVENTION

According to the present invention, a fire fighting trainer is provided. This trainer comprises a burner system, a diffuser, and a support for the burner system and the diffuser, the burner system having a delivery pipe with holes for ejecting propane liquid and having a control connected to the delivery pipe and having a pilot unit, and the diffuser including an open tank and including a volume of water or other medium, contained in the tank in which the delivery pipe is immersed.

By using an open tank with a volume of water, or other medium, in which the delivery pipe is immersed, the difficulty of lighting and controlling the propane vapor is minimized. Also, the flame of the propane vapor has the appearance of a liquid fuel spill flame.

The foregoing and other objects, features, and advantages will be apparent from the following description of the preferred embodiment of the invention as illustrated in the accompanying drawings.

DESCRIPTION OF THE PREFERRED EMBODIMENT

Figure 1:
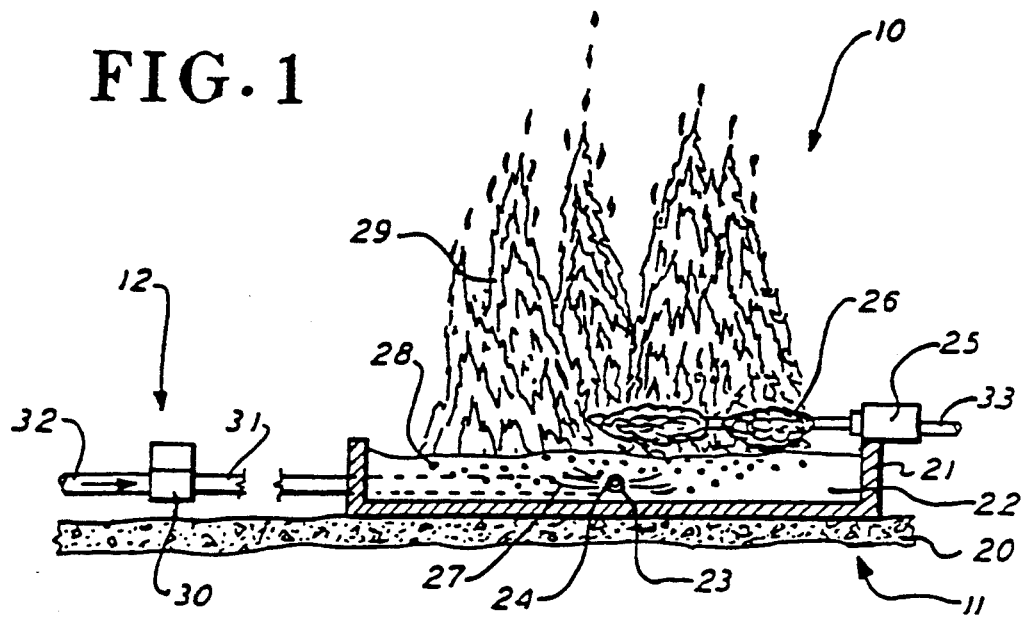
FIG. 1 is a section view of a fire fighting trainer according the invention.
Figure 2:
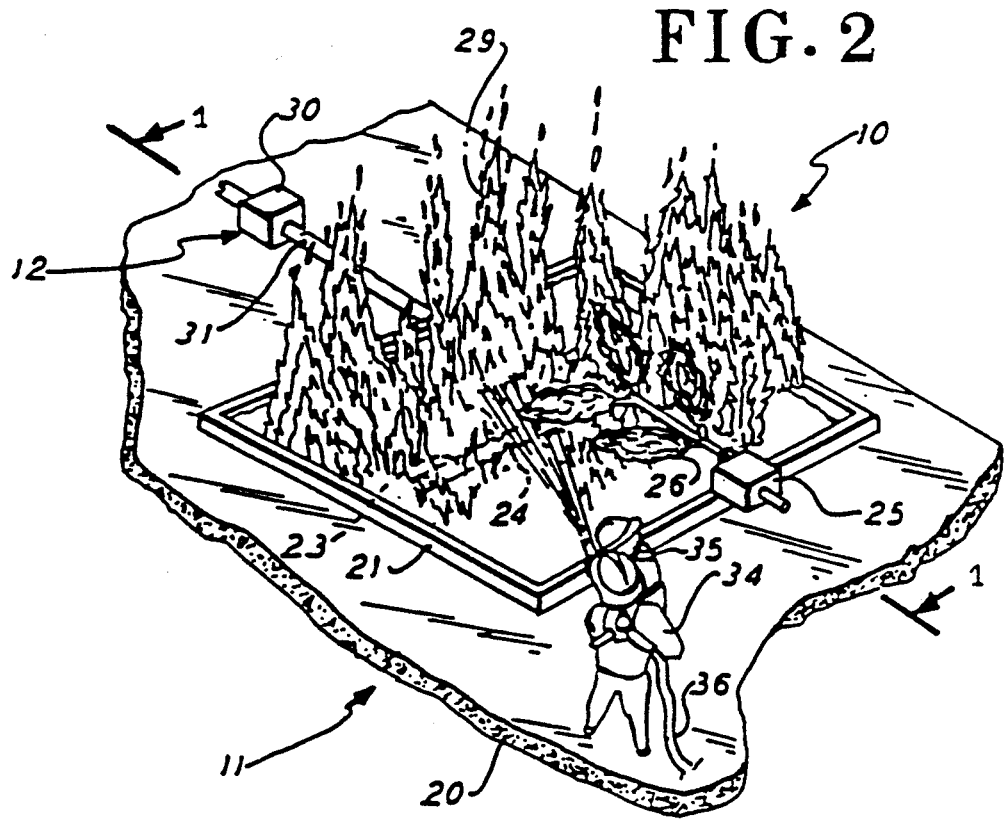
FIG. 2 is a perspective view of the fire fighting trainer of FIG. 1.

As shown in FIGS. 1 and 2, a fire fighting trainer 10 is provided, trainer 10 includes a diffuser 11, a burner system 12, and a support 20.

Diffuser 11 has an above-ground reservoir, or open tank 21 and has in this embodiment a volume of water 22, which is contained in tank 21.

Burner system 12 has a transverse liquid fuel, or pressurized liquid propane delivery pipe 23. Pipe 23 has a plurality of holes 24. Burner system 12 also has an igniter or pilot flame device 25, which provides a pilot flame 26. Pipe 23 has pressurized liquid propane 27, which jets out or which is expelled into water 22. Liquid propane 27 then flashes into propane vapor 28, which diffuses through water 22 as propane vapor bubbles. Propane vapor 28 forms a flame on fire 29, which is disposed at the water surface.

Burner system 12 also has a control or valve unit 30. Control 30 has a line 31, which is connected to transverse pipe 23. Control 30 is also connected to a supply line 32. Pilot flame device 25 has a pilot line 33, which is connected to a suitable gas supply (not shown). Fire fighters 34, 35, as shown in FIG. 2, use a hose 36 to fight the fire 29. Tank 21 is made of steel or other suitable fireproof material. Support 20 is made of concrete or other suitable material. Pipes 23, 31, 32, 33 are made of metal material.

In operation, when liquid propane is introduced into the propane delivery pipe 23 under pressure, the propane liquid 27 jets out of the holes 24 in pipe 23 and flashes to vapor, diffusing through the water 22 as bubbles of vapor 28. As the propane vapor 28 reaches the surface of water 22, it is ignited by pilot flames 26 and produces a flame 29 that burns on the surface of the water. The size of flame 29 may be varied from relatively small to large by control 30 which adjusts the rate of flow. Control 30 can be used to shut off liquid propane flow immediately in an emergency situation.

In summary, trainer 10 has an open water tank 21 and propane delivery pipe 23, installed below the surface of water 22. Pipe 23 has holes 24, drilled along its submerged length. When liquid propane is introduced into delivery pipe 23 and out of holes 24, it flashes to propane vapor, and is diffused into water 22 throughout the vicinity of pipe 23. The propane vapor rises to the surface and burns on the surface of water 22, when ignited by a previously confirmed pilot flame 26, with the appearance of spilled liquid fuel, such as oil, gasoline, or jet fuel, burning on the surface of water 22.

Trainer 10 permits the us of clean-burning propane as a fuel in a device for training fire fighters 34, 35. Trainer 10 avoids the need of prior art trainers to burn oil or jet fuel, which produce a relatively large amount of pollutants.

Advantages of trainer 10 are indicated hereafter.

A) Trainer 10 utilizes liquid propane for training fire fighters in extinguishment of relatively large fires, comparable to fuel spill fires or aircraft crash fires.

B) Trainer 10 produces a controlled simulated fire, which is comparable to a real burning liquid fire.

While the invention has been described in its preferred embodiment, it is to be understood that the words which have been used are words of description rather than limitation and that changes may be made within the purview of the appended calms without departing from the true scope and spirit of the invention in its broader aspects.

For example, tank 21 can be installed in the ground instead of above the ground.

As another example, tank 21 can utilize other dispersive media, e.g. gravel, instead of water.

As another example, pipes 23, 31, 32 can be made of plastic material instead of metal material.

As still another example, igniter 25 can be an electric igniter, instead of a pilot flame device.

As a further example, trainer 10 can include safety monitors and sensing devices, or the like.

As a still further example, pipe 23 can have a different configuration. Also, a plurality of side-by-side open tanks can be used in place of a single tank 21.

What is claimed is:

1. In a firefighting trainer comprising a supply means for supplying a pressurized liquid fuel and distribution means connected to the supply means for distributing the liquid fuel into liquid fuel jets for simulating a fire of combustible materials, the improvement which comprises diffusing means cooperating with the distribution means comprising a volume of medium in which the distributing means is disposed, the medium contained in a tank having a surface open to the atmosphere on which vapor of the liquid fuel is collected; and ignition means for igniting the liquid fuel vapor on the medium surface to simulate a gasoline or similar fire.

2. The trainer of claim 1, wherein: the supply means includes a supply pipe means and a valve means connected to the supply pipe means and a valve pipe means connected to the valve means.

3. The trainer of claim 1, wherein: the distribution means includes a transverse pipe means connected to the supply means, the transverse pipe means having a plurality of holes for forming liquid fuel jets.

4. The trainer of claim 1, wherein: the diffusing means includes an open water tank having a support, and the volume of fluid is a volume of water contained in the open tank for changing liquid fuel jets to fuel vapor bubbles, and the fluid surface is a water surface on which the fuel vapor collects.

5. The trainer of claim 1, wherein: the ignition means includes a pilot flame device which provides a pilot flame for igniting the fuel vapor on the water surface.

6. The trainer of claim 1, wherein: the liquid fuel is liquid propane.

7. The firefighting trainer as defined in claim 1 wherein the medium is water.

8. The firefighting trainer as defined in claim 1 wherein the medium is gravel.

9. A liquid propane firefighting burner comprising: a distribution pipe having a plurality of orifice holes; an open water tank for a volume of water for disposing the distribution pipe in the volume of water; the distribution pipe being mounted inside the open water tank and is connected to a connecting pipe which supplies pressurized liquid propane to the distribution pipe so that the liquid propane can jet out from the holes and then pass through the water as propane vapor bubbles and then collect as propane vapor on the water surface open to the atmosphere; and ignition means for lighting the propane vapor on the water surface to form easily accessible flames simulating liquid fuel flames.

10. A method of fighting a training fire including the steps of: supplying a pressurized liquid propane; distributing the pressurized liquid propane; forming liquid propane jets; disposing the liquid propane jets in a medium disposed in an open tank, said medium having an upper surface exposed to the atmosphere; diffusing the liquid propane jets into bubbles of propane vapor passing through the medium; collecting the propane vapor on the medium surface; igniting the propane vapor on the medium; and burning the propane vapor on the medium surface to form flames.

11. The method as defined in claim 10 wherein the medium is water.

12. The method as defined in claim 10 wherein the medium is gravel.

* * * * *